United States Patent [19]

Shaffer

[11] 4,189,274
[45] Feb. 19, 1980

[54] TWO-WHEELED CYCLE BUMPER CARRIER FOR MOTOR VEHICLES

[76] Inventor: Ernest M. Shaffer, 5861 Dugan Ave., La Mesa, Calif. 92041

[21] Appl. No.: 915,543

[22] Filed: Jun. 14, 1978

[51] Int. Cl.² .............................................. B60R 9/00
[52] U.S. Cl. .............................. 414/462; 224/42.03 B; 224/42.08
[58] Field of Search ............... 414/462, 480, 537, 538, 414/642; 224/42.03 R, 42.03 B, 42.08

[56] References Cited

U.S. PATENT DOCUMENTS

| 3,348,713 | 10/1967 | Will | 414/462 |
| 3,720,333 | 3/1973 | Vaughn | 414/462 |

Primary Examiner—Stephen G. Kunin
Assistant Examiner—George F. Abraham

[57] ABSTRACT

An improved carrier to facilitate the loading and unloading of two-wheeled cycles from motor vehicle bumpers having an adjustable ramp assembly and mechanism for linear as well as rotational movement of the track assembly.

1 Claim, 12 Drawing Figures

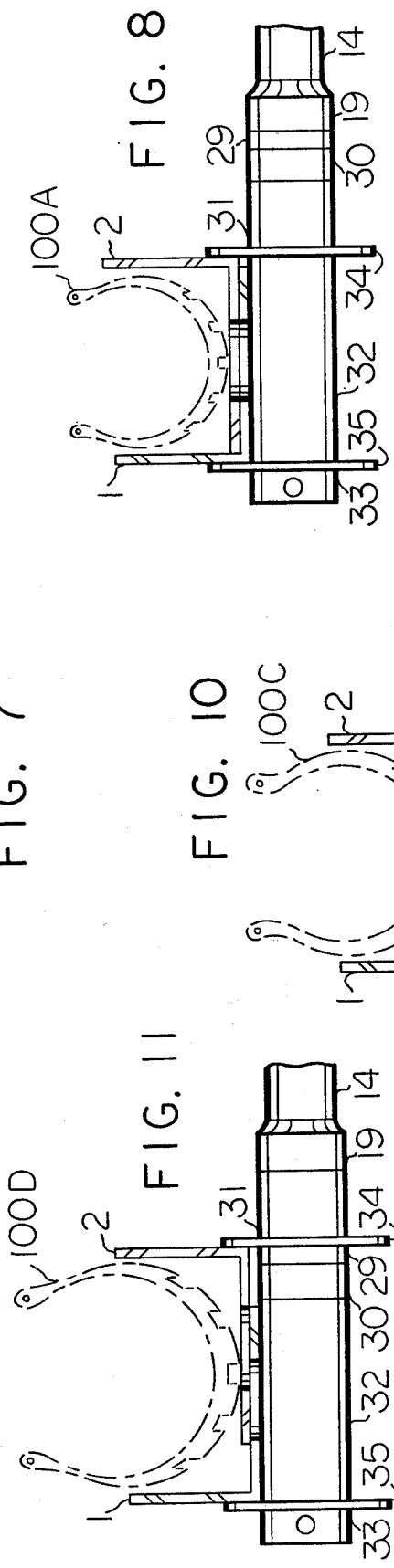

TWO-WHEELED CYCLE BUMPER CARRIER FOR MOTOR VEHICLES

FIELD OF INVENTION

In a TWO-WHEELED CYCLE BUMPER CARRIER FOR MOTOR VEHICLES that facilitates the easy loading and unloading of cycles by eliminating direct lifting effort. The apparatus is clamped to a bumper and comprises two cantilevered structural supporting members to which free-wheeling sleeves are a part to allow an adjustable width tire track channel to roll upon and tilt into an inclined ramp position restrained by guide rails attached to the channel. The apparatus is also provided with a pedal crank clamping mechanism to securely fasten the cycle to the carrier.

OBJECT

There have been various attempts to develop an apparatus for the convenient loading, unloading and transporting of two-wheeled cycles such as motorcycles and mopeds.

My invention provides features that those of prior art do not provide, such as a universal tire track channel that is adjustable to accommodate various tire widths. Another unique advantage is an independent track assembly with simple guide rails that will allow the track to roll on free-wheeling sleeves and tilt into an inclined ramp position of gradual slope letting a two-wheeled cycle to be pushed up easily. When the front tire drops into a cutout in the track channel located near the front of the track both the track and cycle will move forward as a unit until the track tilts and rolls forward into the locking position. The cycle is then secured to the apparatus by means of a pedal crank clamping mechanism and elastic cords universally used as tie downs. As a result the cycle is almost centered over two separated cantilevered structural supporting members and the load is distributed between them equally and transferred by the most direct route to the bumper brackets and therefore to the bumper. This method implements the use of commercially available bumper bracket attachments that are made to be universal and adjustable to fit most formed bumpers found on motor vehicles.

Further objects and advantages of my invention will become apparent from a consideration of the drawings and ensuing description thereof.

DRAWINGS

FIG. 1 of the accompanying drawings is an isometric view of the complete apparatus in a locked position as shown mounted to the bumper of a motor vehicle.

FIG. 7 is an exploded detail view of the set of sleeves and guide washers as they go together on the spindle part of the cantilevered rod member.

FIGS. 8, 9, 10, 11 and 12 are a series of cross section views of the tire track channel showing how by interchanging the set of sleeves of various lengths between the guide washers that the track width can be changed to accommodate various tire widths.

DISCUSSION OF PRIOR ART

Figure 1:
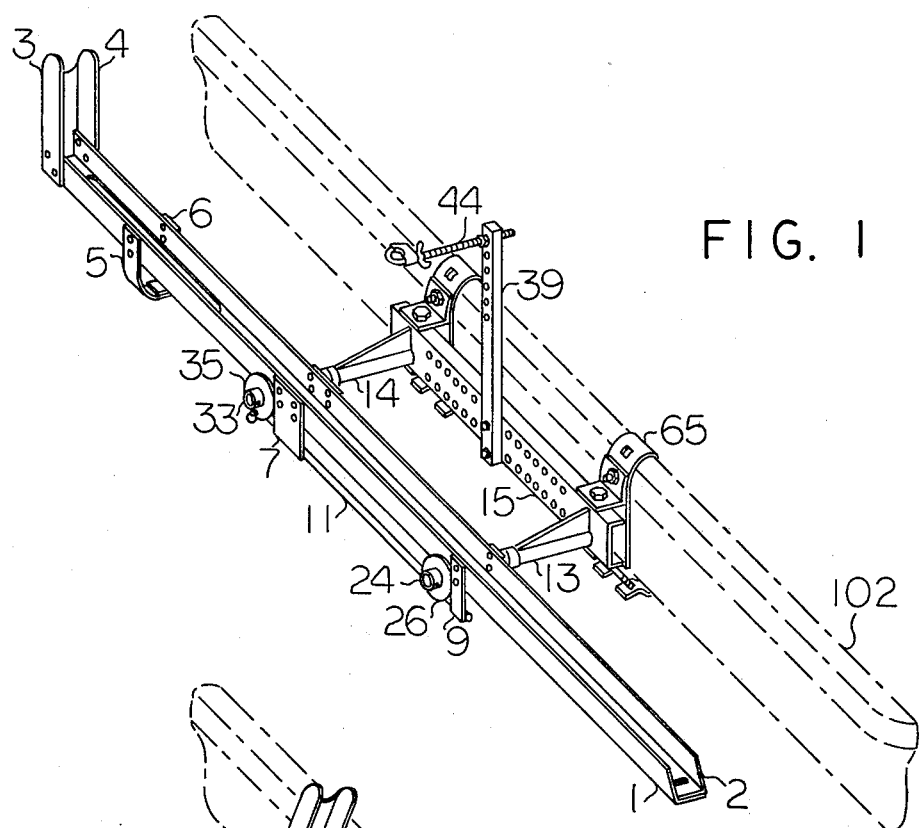
Figure 2:
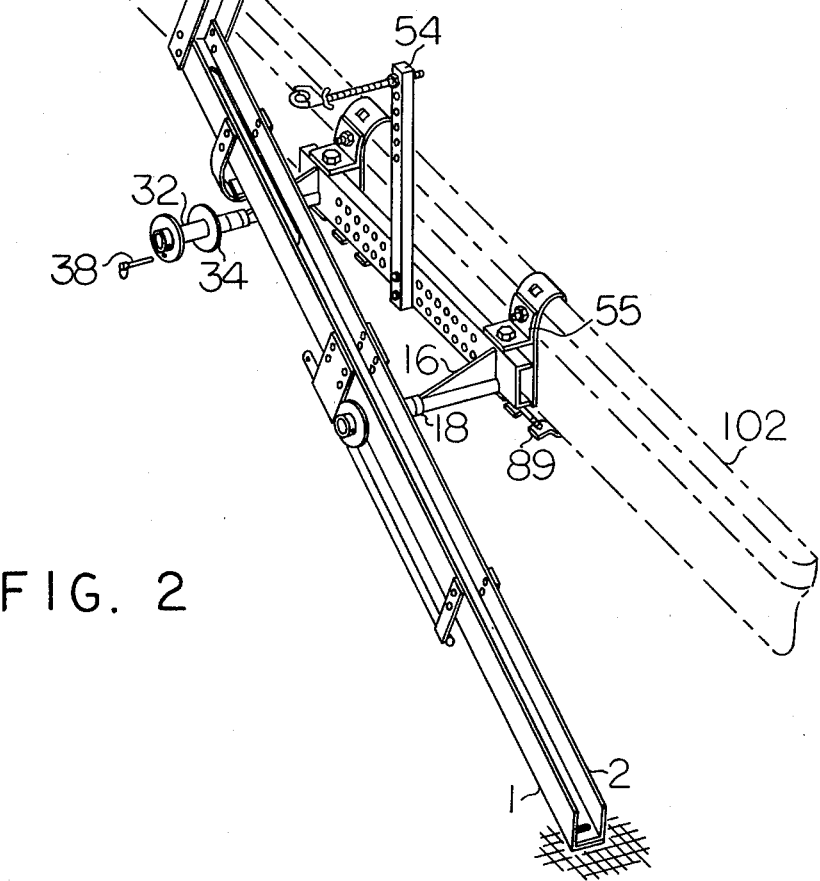
FIG. 2 is an isometric view of the complete apparatus with the track rolled back and tilted in a loading ramp position.
Figure 3:
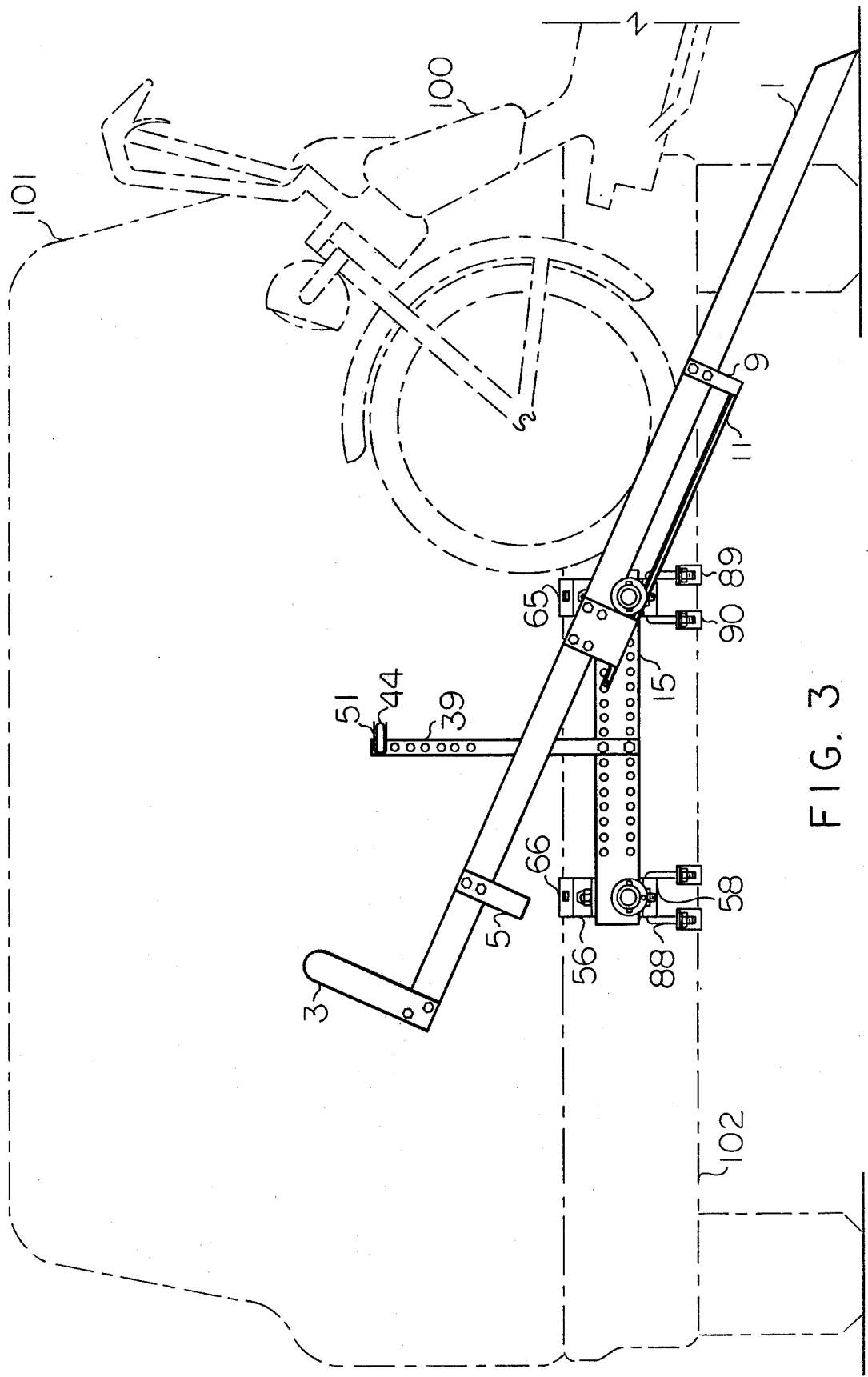
FIG. 3 is a front elevation representing the loading position with respect to the two-wheeled cycle being pushed up the ramp.
Figure 4:
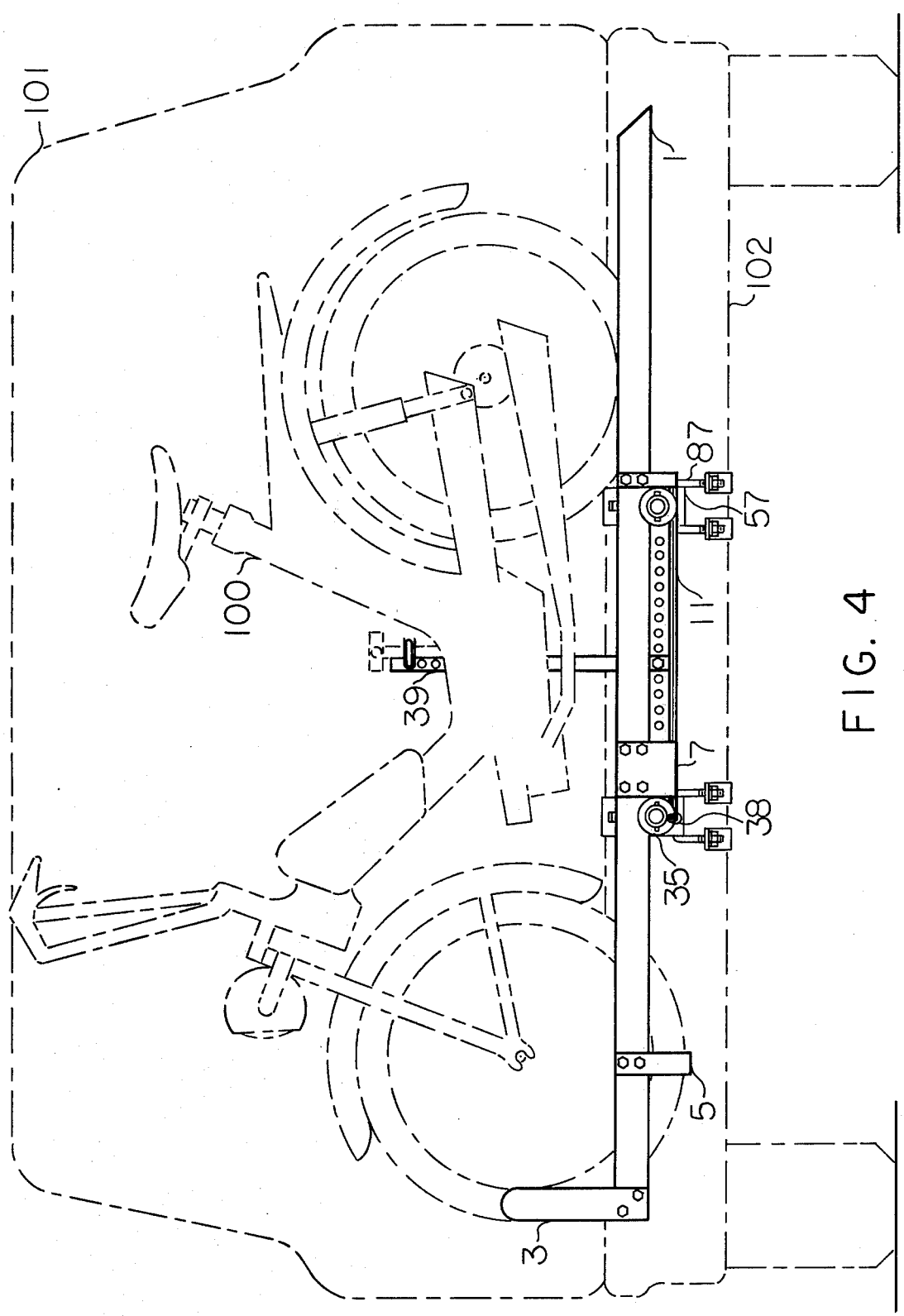
FIG. 4 is a front elevation showing the two-wheeled cycle loaded with its front tire dropped in the track cutout and pedal crank secured by a clamping mechanism.
Figure 5:
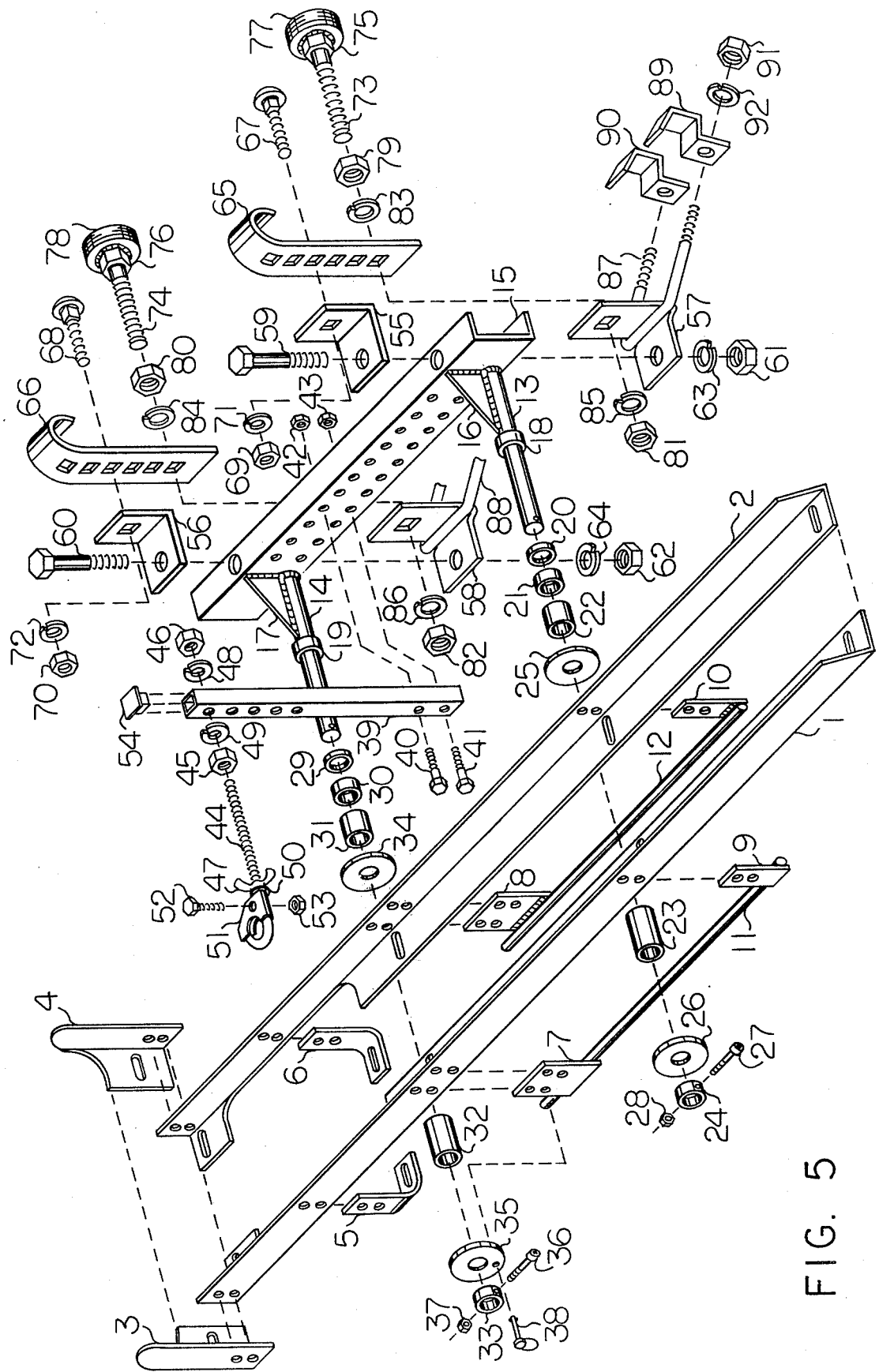
FIG. 5 is an exploded view of the major components of the apparatus showing how they fit together.
Figure 6:
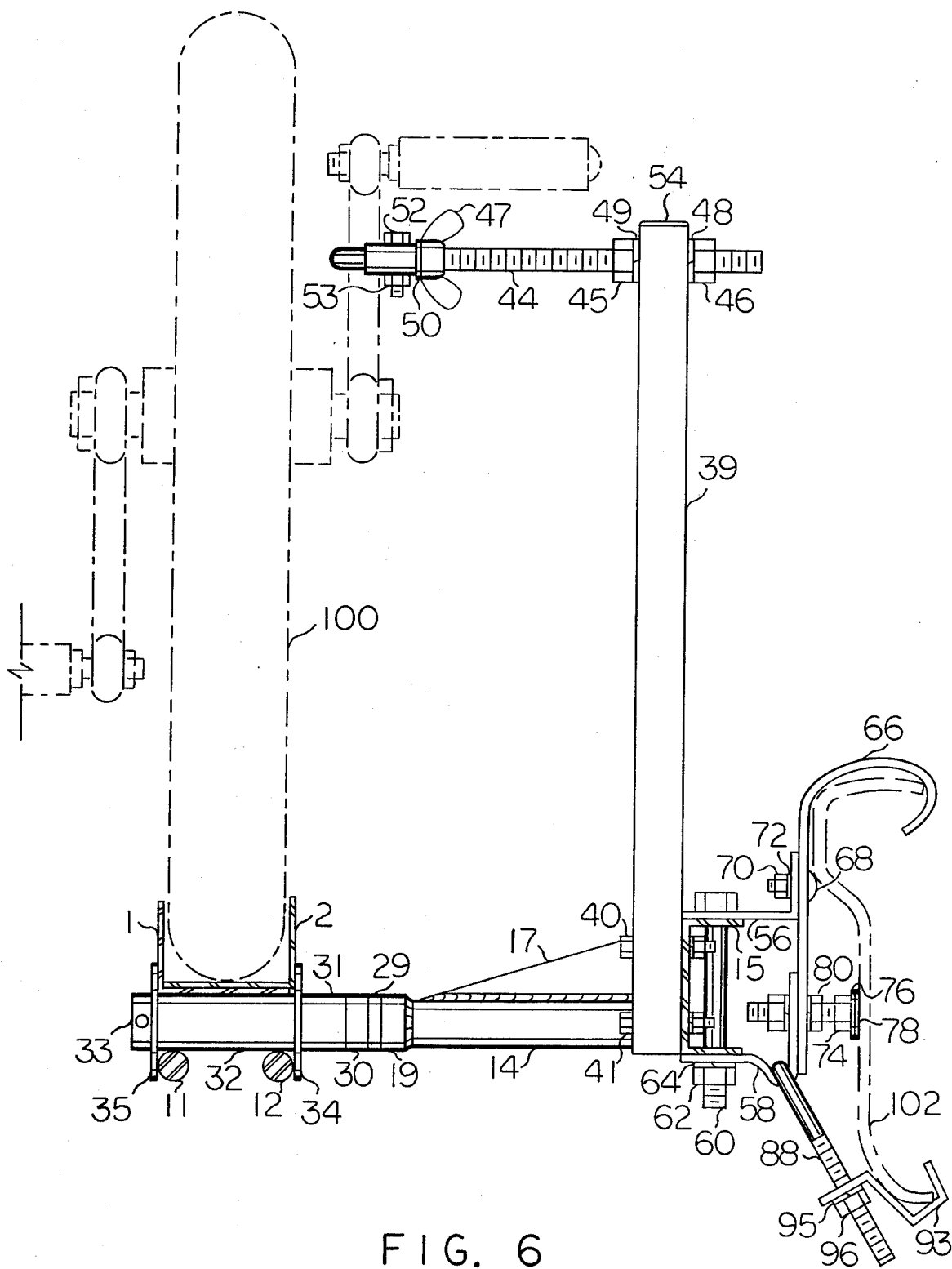
FIG. 6 is a cross section view of the apparatus and bumper taken at approximately the center of the apparatus.

In review of previous inventions relating to cycle carriers, I conclude that my invention is superior by comparison because of the following reasons:

In U.S. Pat. Nos. 3,458,073; 3,529,737; 3,567,052; 3,760,965

The ramps are all pivoted at one extreme end with the other end requiring either manual lifting, a bumper jack, or screw jack type landing gear to load the cycle. All these methods are cumbersome when compared to my invention where the cycle is pushed up the ramp, tilts itself and then rolls forward to a locking position.

In U.S. Pat. No. 3,760,965

The carrier is limited because of its design to only motor vehicles with a standard trunk and is not feasible for station wagons, fastbacks or vans. Its complexity of construction and appearance lessens its marketability.

Another possible alternative to my invention may include a center pivot system using only one major cantilevered structural member located near the center of the ramp to counter balance the load. I note that my invention has a distinct structural advantage over such a system. Because most all motor vehicles have a license plate recess in the center of their bumpers any attachments to the bumper must be made on either side of this recess. A center pivot support therefore must transfer the load indirectly thru horizontal member(s) that will be subjected to both bending and torsional stress before the load is transmitted to the bumper attachments and then the bumper. Also because the rear wheel of the cycle is much further away from the center support the track will experience a great deal of bending stress because of the loading conditions.

In my invention there is no torsional stresses in the apparatus because the load is transferred directly to the bumper. Also because there are two major cantilevered structural members spaced apart the load distribution is more even and because the distance between the wheel and a support is closer the bending stress in the track is reduced. These important considerations give my invention more structural integrity, better load carrying capacity and a much better strength to weight ratio over the center pivot system.

Having described and illustrated my invention, it is to be understood that the foregoing relates to only a preferred embodiment and is intended to cover all changes and/or modifications which may become apparent to those skilled in the particular art and that the herewith described device could be constructed in various forms and still remain within the essence of the basic concept.

DESCRIPTION

In reference to the accompanying drawings composed of twelve figures the following correlated nomenclature and details apply.

Converse legs of angles 1 and 2 overlap and fasten at provided slots to constitute a fabricated channel of prescribed length but of adjustable width. Similarly, the legs of angles 3 and 4 overlap, fasten at provided slots and connect perpendicular in an upward direction to the forward end of combined angles 1 and 2. The resultant configuration furnishes a backstay and brace support for front tire of cycle 100. Also, formed straps 5 and 6 overlap, fasten at provided slots and connect perpendicular in a downward direction to angles 1 and 2. The formed saddle shape created limits movement and contributes to the support of said front tire that protrudes thru cutouts provided in overlapped legs of angles 1 and 2. Flat plates 7 and 8 and flat bars 9 and 10 weld to opposite ends of rods 11 and 12 in the same plane as to complete a pair of guide rails that fasten to the sides of angles 1 and 2. This completes the track ramp subassembly.

Two cantilevered rods 13 and 14 weld perpendicular to horizontal channel member 15 positioned one near each end and reinforced by gussets 16 and 17 respectfully. Along the middle section of rods 13 and 14, stop sleeves 18 and 19 are located and welded correspondingly. Sleeves 20, 21, 22, and 23, flat washers 25 and 26 along with said track ramp subassembly fit and slip over end of rod 13 in a selected sequence according to the width of track channel desired. The last sleeve 24 equipped with a hole that matches the alignment of a hole near end of rod 13 is retained by bolt 27 and locknut 28. In a similar manner sleeves 29, 30, 31 and 32 of the same various lengths of sleeves 20, 21, 22, and 23 along with flat washers 34 and 35 fit and slip over end of rod 14 in the same selected sequence. Another sleeve 33 also equipped with a hole matches the alignment of a hole near end of rod 14 and is retained by bolt 36 and locknut 37. Flat washer 35 and guide rod 11 are provided with holes that match up when track subassembly is in the relative horizontal position and are locked together by shear pin 38.

Said horizontal channel member 15 contains two rows of holes along its length that align with matching holes in upright tube 39 with top plug button cap 54. Said upright tube is fastened by bolts 40 and 41 and locknuts 42 and 43. The upper section of upright tube 39 contains a single series of holes along its length to accept a pedal crank clamping device comprised of a threaded hook bolt 44, nuts 45 and 46, wing nut 47, lock washers 48 and 49, flat washer 50, formed sheet metal part 51 retained by bolt 52 and locknut 53. Horizontal channel member 15 is fastened to upper bracket angle 55 and 56 and lower bracket angle 57 and 58 with common bolts 59 and 60, nuts 61 and 62 and lock washers 63 and 64. These upper bracket angles 55 and 56 are fastened to upper bumper hook straps 65 and 66 with carriage bolts 67 and 68, nuts 69 and 70 and lockwashers 71 and 72. The lower bracket angles 57 and 58 are fastened to the upper bumper hook straps 65 and 66 with adjustable bumper rest bolts 73 and 74, heads of which are welded to flat washers 75 and 76 to provide adequate bearing surface and attachment of cushion pads 77 and 78. Bolts 73 and 74 are retained by nuts 79, 80, 81 and 82 and lockwashers 83, 84, 85, and 86. Lower bracket angles 57 and 58 are fastened to the lower edge of bumper 102 with hook straps 89, 90, 93 and 94 using threaded U-bolts 87 and 88 with nuts and lock washers similar to 91 and 92 respectfully.

I claim:

1. A two-wheeled cycle bumper carrier apparatus comprising: a track assembly provided with guide rails that permit the track assembly to move in a linear direction upon a set of free-wheeling sleeves and tilt into an inclined ramp position which is most convenient to wheel-up and load a two-wheeled cycle; said track assembly and set of sleeves are adjustable to accommodate various tire widths; said set of sleeves are mounted on each of two cantilevered rod members solidly attached and reinforced to and supported by a single horizontal structural member supported by two bumper bracket attachments; said cantilevered members are substantially in alignment with bumper brackets for a direct load transfer to the bumper; said track assembly has a cutout to permit the front tire of a cycle to drop into and adjustable brackets to support and brace the front tire; said horizontal structural member has a series of holes providing attachment and adjustment along its length for a vertical member with an adjustable crank lock mechanism that is clampable onto various cycle pedal cranks.

* * * * *